United States Patent
Agrawal (10) Patent No.: US 8,701,156 B1
(45) Date of Patent: Apr. 15, 2014

(54) SYSTEM FOR DATA LOSS PREVENTION HANDSHAKE BETWEEN COMPUTING SYSTEMS

(75) Inventor: Mukund Agrawal, Pune (IN)

(73) Assignee: Symantec Corporation, Mountain View, CA (US)

( * ) Notice: Subject to any disclaimer, the term of this patent is extended or adjusted under 35 U.S.C. 154(b) by 53 days.

(21) Appl. No.: 13/242,118

(22) Filed: Sep. 23, 2011

(51) Int. Cl.
*H04L 29/00* (2006.01)

(52) U.S. Cl.
USPC ......... 726/1; 726/27; 726/28; 726/29; 726/30

(58) Field of Classification Search
USPC ............................................................. 726/1
See application file for complete search history.

(56) References Cited

U.S. PATENT DOCUMENTS

| | | | |
|---|---|---|---|
| 8,060,596 B1 * | 11/2011 | Wootton et al. | 709/223 |
| 8,341,734 B1 * | 12/2012 | Hernacki et al. | 726/21 |
| 2010/0306850 A1 * | 12/2010 | Barile et al. | 726/25 |
| 2012/0106366 A1 * | 5/2012 | Gauvin | 370/252 |
| 2012/0151551 A1 * | 6/2012 | Readshaw et al. | 726/1 |

* cited by examiner

*Primary Examiner* — Ghazal Shehni
(74) *Attorney, Agent, or Firm* — Lowenstein Sandler LLP (57) ABSTRACT

A method and apparatus for determining whether a second computing system meets a minimum level of protection for a DLP policy of a first computing system are described. A DLP agent may monitor outbound data transfers performed by the first computing system, and determines a violation of a DLP policy in a current one of the outbound data transfers to a second computing system. The DLP agent initiates a handshake protocol with the second computing system to determine whether the second computing system meets a minimum protection level for the DLP policy. If the second computing system does not meet the minimum protection level for the DLP policy, the DLP agent prevents the current data transfer to the second computing system; otherwise, the DLP agent permits the current data transfer.

20 Claims, 4 Drawing Sheets

SYSTEM FOR DATA LOSS PREVENTION HANDSHAKE BETWEEN COMPUTING SYSTEMS

TECHNICAL FIELD

Embodiments of the invention relate to the field of processing data, and more particularly, to improving data loss prevention (DLP) by a DLP handshake protocol between computing systems.

BACKGROUND OF THE INVENTION

A modern organization typically maintains a data storage system to store and deliver sensitive information concerning various significant business aspects of the organization. Sensitive information may include data on customers (or patients), contracts, deliveries, supplies, employees, manufacturing, or the like. In addition, sensitive information may include intellectual property (IP) of an organization such as software code developed by employees of the organization, documents describing inventions conceived by employees of the organization, etc.

Organizations take lot of efforts to install DLP components, especially on important machines where confidential data is getting generated, but they may not be able to protect each computer in the enterprise, due to reasons like large number of different platforms or operating systems (OS), machine outages, quick and dynamic provisioning of virtual machines, no clear and individual accounting for test and lab machines. DLP technologies apply configurable rules to identify objects, such as files, that contain sensitive data and should not be found outside of a particular enterprise or specific set of host computers or storage devices. Even when these technologies are deployed, it is possible for sensitive objects to 'leak'. Occasionally, leakage is deliberate and malicious, but often it is accidental too. For example, in today's global marketplace environment, a user of a computing system transmits data, knowingly or unknowingly, to a growing number of entities outside a computer network of an organization or enterprise. Previously, the number of entities were very limited, and within a very safe environment. For example, each person in an enterprise would just have a single desktop computer, and a limited number of software applications installed on the computer with predictable behavior. More recently, communications between entities may be complex and difficult for a human to monitor.

A very simple way that data losses can happen in a company is that people may copy data from a DLP protected machine to another which is not protected, and then copy data from the second machine to external storage, which can be easily detached and carried outside the organization. For example, data can be first copied from a Windows machine to Linux/Unix servers which are typically not protected by DLP solutions, and then copied to USB drives and taken out of the organization. The reason why this happens so easily is data loss prevention components protect confidential data from leaving the network boundaries, and protect confidential data from being copied to external storage devices like USB drives. However, they do not prevent data being transferred from one machine to another within an organization, for example. The reason is preventing data flow inside an enterprise may hamper the normal functioning of the enterprise. This provides an easy two-step process to steal confidential data as described above.

Even if the second machine is protected by DLP solution, it can easily happen that the various configurations of the component on the second machine may be out of date. For example, when a new policy was added to the main DLP server, this machine could be disconnected or shutdown, due to which it may not have the latest policies. Another case is confidential data gets generated at all times in a big enterprise. This may be continuously fed into DLP engine, which may continually training itself (e.g., using data mining techniques like data classification), or continually generating fingerprints for new confidential documents. Thus, it can happen that the second machine lags in terms of having latest data specifications that define confidential data. These kinds of situations allow confidential data being copied from first machine to second machine, and then getting stolen from the second machine.

There could be DLP rules/policies stating that the information should go to the computers within the enterprise, but not outside it. Some examples are mail from management to employees, design documents of products, source code, etc. So, this information is not highly sensitive like a person's credit card number, and thus may not need to be quarantined, but is still confidential from perspective of the company. In such cases, the company may want to allow such information flow between computers within the enterprise, but make sure that such information does not leave the enterprise, for example, either over the Internet or over detachable USB devices.

The conventional solutions are related to making a machine security as strong as possible to prevent immediate data losses from the machine or to external networks. But, they do not address the problem of a two-step data loss where data is first transferred to another machine, and the second machine is not equipped to prevent a confidential data loss. The second machine may not necessarily be a malicious machine, and may in fact hold a lot of confidential data, which it may be able to protect. Hence, reputation or trust based solutions do not work here.

There is no workaround other than making sure that each and every machine in the organization is completely well protected by the DLP solution, which may not always be practical as described above. Thus, existing security techniques fail to provide efficient solutions that can protect organizations in the situations described above.

SUMMARY OF THE INVENTION

A method and apparatus for determining whether a second computing system meets a minimum level of protection for a DLP policy of a first computing system are described. In one exemplary embodiment of a method, a computing system, using a DLP agent, monitors outbound data transfers performed by the computing system, and determines a violation of a DLP policy in a current one of the outbound data transfers to a second computing system. The DLP agent initiates a handshake protocol with the second computing system to determine whether the second computing system meets a minimum protection level for the DLP policy. The DLP agent initiates the handshake protocol and based on information from the handshake protocol decides whether the second computing system can sufficiently protect the data from data loss if the first computing system were to transfer the data to the second computing system. If the second computing system does not meet the minimum protection level for the DLP policy, the DLP agent prevents the current data transfer to the second computing system; otherwise, the DLP agent permits the current data transfer. The DLP agent may monitor the outbound data transfers to determine if the data transfers include protected information, such as confidential or sensitive data. In another embodiment, the DLP agent initiates the handshake protocol with a second DLP agent of the second computing system. The second DLP agent may be developed by the same vender as the DLP agent or may even be developed by a different vendor.

In another embodiment, the DLP agent temporarily blocks the current outbound data transfer to the second computing system in response to detecting the violation of the DLP policy. While temporarily blocking the transfer, the DLP agent determines whether the second computing system meets the minimum protection level for the DLP policy. Upon this determination, the DLP either permits or prevents the current data transfer if the second computing system does not meet or meets, respectively, the minimum protection level for the DLP policy.

In one embodiment, the handshake protocol includes various operations, including verifying a presence of a second DLP agent on the second computing system and determining if the second DLP agent meets the minimum protection level for the DLP policy. In one embodiment, the DLP agent determines if the second DLP agent meets the minimum protection level by verifying a version of the second DLP agent, verifying a version of a second DLP policy of the second DLP agent, or a combination of both. In one embodiment, the DLP agent detects that the current outbound data transfer includes protected information. The DLP agent verifies that signatures of the second DLP policy would detect the protected information in the current outbound data transfer.

In another embodiment, the DLP agent determines when the second DLP agent was last updated and determines whether the second DLP agent has any missing updates in between when the second DLP agent was last updated.

In one embodiment, the computing systems making the data transfer reside in different networks. In another embodiment, the computing systems making the data transfer reside in the same network, such as a private local area network (LAN).

In another embodiment, the DLP agent, via the handshake protocol, exchanges information to update the second computing system to meet the minimum protection level. For example, in one embodiment, the DLP agent sends at least one of policy information of the DLP policy, signatures to detect violations of the DLP policy, or the like. In another embodiment, the DLP agent notifies a user of the computing system, an administrator of the computing system, an administrator of an enterprise, or the like, when the second computing system does not meet the minimum protection level for the DLP policy. Alternatively, the DLP agent may perform other DLP operations as would be appreciated by one of ordinary skill in the art having the benefit of this disclosure.

In addition, a computer readable storage medium for determining whether a second computing system meets a minimum level of protection for a DLP policy of a first computing system is described. An exemplary computer readable storage medium provides instructions, which when executed on a processing system causes the processing system to perform a method such as the exemplary methods discussed above.

Further, systems and apparatus for determining whether a second computing system meets a minimum level of protection for a DLP policy of a first computing system are described. An exemplary apparatus may include a memory and a processor coupled to the memory. The processor is configured to perform various operations, such as those described above.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for determining whether a second computing system meets a minimum level of protection for a DLP policy of a first computing system are described. A DLP agent may monitor outbound data transfers performed by the computing system, and determine a violation of a DLP policy in a current one of the outbound data transfers to a second computing system. The DLP agent initiates a handshake protocol with the second computing system to determine whether the second computing system meets a minimum protection level for the DLP policy. The DLP agent initiates the handshake protocol and based on information from the handshake protocol decides whether the second computing system can sufficiently protect the data from data loss if the first computing system were to transfer the data to the second computing system. The handshake protocol can be used to help the first computing system to decide if the second computing system can identify protected data, such as confidential data, and ensure that the second computing system can sufficiently protect the protected data if it were to be transferred to the second computing system. If the second computing system does not meet the minimum protection level for the DLP policy, the DLP agent prevents the current data transfer to the second computing system; otherwise, the DLP agent permits the current data transfer. Thus, a first computing system may transfer data to a second computing system, although it may even be a trusted or non-malicious system, only if the second computing system is proved to be capable of protecting the data from leaks.

The second computing system may be a computer, a mobile phone, an application executing on a computing system, a set of Internet Protocol (IP) addresses, a website, a Universal Serial Bus (USB) device, a disk device, an email address, an instant messenger service, a social network account, a remote application, or the like. In one embodiment, the DLP agent includes a DLP handshake protocol engine to determine whether a second computing system to which data is being transferred meets a minimum level of protection for a DLP policy of a first computing system transferring the data. All outbound data transfer from the computing system is passed through the detection system, which determines whether the data transfer violates a DLP policy based on various factors. If the data transfer violates the DLP policy, the DLP handshake protocol engine temporarily blocks the data transfer and initiates a handshake protocol with the second computing system to determine whether it meets the minimum level of protection as specified in the DLP policy. If it meets the minimum level of protection, the data transfer is permitted; otherwise, it is denied. Alternatively, other remedial or preventive actions may be taken to protect the protected data.

As described above, existing security techniques fail to provide efficient solutions that can protect organizations in the situations described above in transferring to another device that is not protected. The embodiments described herein provide an improved DLP system that allows the transmitting system to determine whether the receiving system meets the minimum level of protection to protect the data being transferred to the receiving system. These embodiments may be used to easily monitor outbound data transfers to various destination entities, detect violations of DLP policies, and determine whether the destination entities can protect the data being transferred when the data is deemed to be protected data.

In the following description, numerous details are set forth. It will be apparent, however, to one of ordinary skill in the art having the benefit of this disclosure, that embodiments of the present invention may be practiced without these specific details.

Figure 1:
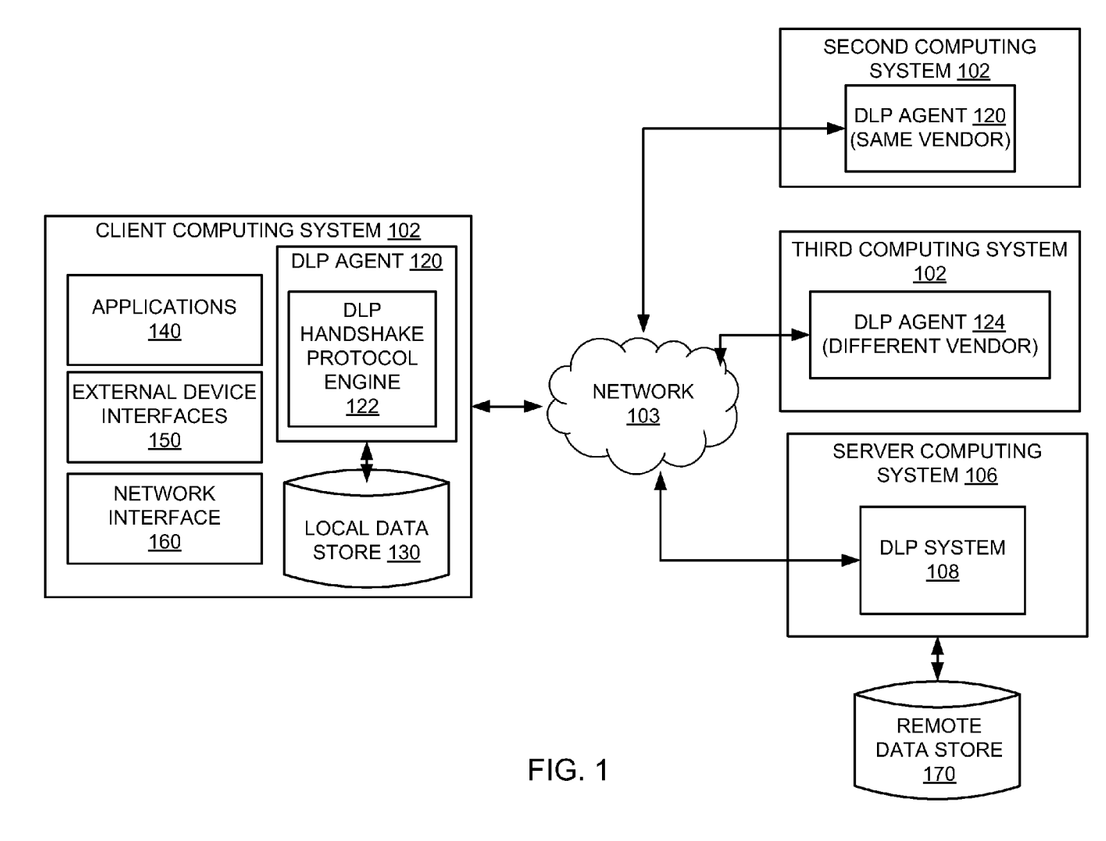
FIG. 1 is a block diagram of exemplary network architecture in which embodiments of a DLP handshake protocol engine may operate.

FIG. 1 is a block diagram of an exemplary network architecture 100 in which embodiments of a DLP handshake protocol engine 122 may operate. The network architecture 100 may include multiple client computing systems 102 and a server computing system 106 coupled via a network 103 (e.g., public network such as the Internet or private network such as a local area network (LAN)). The client computing system 102 may include personal computers, laptops, PDAs, mobile phones, network appliances, etc. The server computing system 106 may be a network appliance, a gateway, a personal computer, etc. The client computing systems 102 and the server computing system 106 may reside on the same LAN, or on different LANs that may be coupled together via the Internet, but separated by firewalls, routers, and/or other network devices. In another embodiment, the computing systems may reside on different networks. The server computing systems 106 may host a DLP system 108. In one embodiment, the client computing systems 102 and server computing systems 106 may be part of an organization, such as a corporate enterprise. Alternatively, the server computing system 106 and the computing systems 102 may be part of different organizations.

The DLP system 108 may communicate with DLP agents 120. Although the embodiments may be used in a DLP system using DLP agents 120, the embodiments may also be used in other DLP products. Also, the embodiments described herein may be used in other applications that can be used for detecting violations of policies as would be appreciated by one of ordinary skill in the art having the benefit of this disclosure.

The DLP agents 120 include a DLP handshake protocol engine 122, which is configured to determine whether a destination entity, such as the second computing system 102, the third computing system 102, the server computing system 106, or other devices, such as remote devices, USB drives, network drives, or the like, meet a minimum protection level as specified in a DLP policy of the client computing system 102 (or the DLP system 108). The DLP agent 120 monitors outbound data transfers by the client computing system 102 (e.g., transmitting entity) to destination entities to detect violations of the DLP policy. When a violation is detected in one of the data transfers, the DLP handshake protocol engine 122 initiates a handshake protocol with the destination entity to determine if the destination entity meets a minimum protection level as specified by the DLP policy. In one embodiment, the destination entity is the second computing system 102, which includes a DLP agent 120, developed by the same vendor as the DLP agent 120 of the client computing system 102. In another embodiment, the destination entity is a third computing system 102, which includes a DLP agent 124, developed by a different vendor as the DLP agent 120.

The DLP system 108 may communicate with DLP agents 120 on the client computing systems 102 to perform operations to enforce a DLP policy as described herein. The DLP agent 120 is configured to detect a violation of a DLP policy in the outbound data transfers. When a violation is detected, the DLP handshake protocol engine 122 initiates a handshake protocol with the second DLP 120 of the second computing system 102 or the DLP agent 124 of the third computing system 102 to determine whether the DLP agent has sufficient protections in place to protect the data being transferred. If the DLP agent 120 or 124 of the destination entity does not have sufficient protections, then the data transfer can be prevented. If there are sufficient protections at the destination entity, the data transfer can be allowed. When the data transfer violates the DLP policy and the destination entity does not meet the minimum protection level as specified in the DLP policy, the DLP agent 120 creates an incident record of the violation, and may send the incident record to the DLP system 108, for example. The DLP system 108 is configured to receive the incident record of the violation from the DLP agent 120. In these embodiments, the DLP agent 120 creates the incident records. However, in other embodiments, any DLP product may be used to detect a violation and create an incident, and it is not limited to using DLP agents on an endpoint, as described herein. It should also be noted that other systems than DLP systems can use the DLP handshake protocol engine 122 to determine whether the destination entity has sufficient protections to protect the data before sending the data to the different entities.

Although only one server computing systems 106 are illustrated in FIG. 1, the DLP system 108 may be hosed on one or more machines, including one or more server computers, client computers, gateways or other computing devices. In yet another configuration, the DLP service may reside on a single server, or on different servers, coupled to other devices via a public network (e.g., the Internet) or a private network (e.g., LAN). In one embodiment, the DLP system 108 is part of an organization's system referred to herein as entity. In another embodiment, a service provider hosts the DLP system 108. The hosted service provider may also have multiple instances of the DLP system 108 on multiple networks that communicate with the service provider over a public or private network. It should be noted that various other network configurations can be used including, for example, hosted configurations, distributed configurations, centralized configurations, etc.

The depicted client computing system 102, which may operate as an endpoint machine in an enterprise network that uses the DLP system 108 to enforce one or more DLP policies, includes a DLP agent 120 that communicates with the DLP system 108. Embodiments of the DLP agent 120, which includes the DLP handshake protocol engine 122, are described below with respect to FIGS. 2-3. The client computing system 102 may include applications 140, external device interfaces 150, and network interfaces 160 that can be monitored by the DLP agent 102 as would be appreciated by one of ordinary skill in the art having the benefit of this disclosure. Alternatively, the DLP agent 102 can monitor other aspects of the client computing system 102 to monitor outbound data transfers. The client computing system 102 may also include a local data store 130, which can be one or more centralized data repositories that store the violation information, DLP policy information, and the like. The local data store 130 may represent a single or multiple data structures (databases, repositories, files, etc.) residing on one or more mass storage devices, such as magnetic or optical storage based disks, tapes or hard drives. Although illustrated as being local to the client computing system 102, the local data store 130 may be remote from the client computing system 102 and the client computing system 102 can communicate with the local data store 130 over a public or private network.

Figure 2:
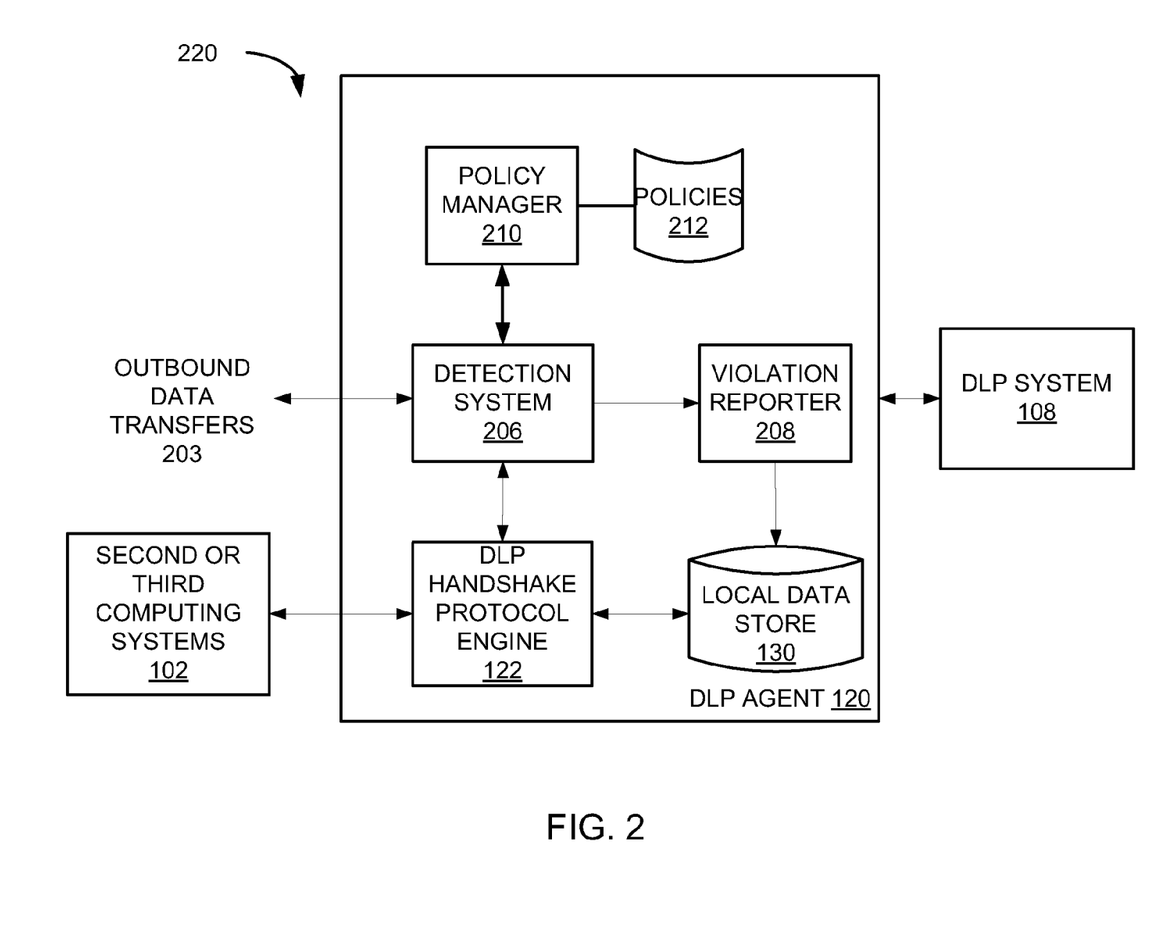
FIG. 2 is a block diagram of one embodiment of a DLP agent, including a DLP handshake protocol engine and a detection system to detect violations of a DLP policy.

FIG. 2 is a block diagram of one embodiment of a DLP agent 220, including the DLP handshake protocol engine 122 and a detection system 206 to detect violations of a DLP policy. The DLP agent 120 also includes a violation reporter 208, a policy manager 210, and a policy data store 212. In the depicted embodiment, the detection system 206 is configured to monitor outbound data transfers 203. The outbound data transfers 203 may include data in transit, such as data associated with outgoing messages or other network traffic being sent by the client computing system 102 to a destination entity. The outbound data transfers 203 may also include data being printed, copied to a remote storage device, such as USB drive, a remote disk, or the like. The outbound data transfers 203 may be any data being transferred by the client computing system 102 via a wireless or wired connection to a destination entity, such as another device or to a remote device, such as, for example, a removable storage drive. The outbound data transfers 203 may be over the network 103 or over direct connections to the client computing system 102.

The detection system 206 is configured to determine whether the data transfer 203 violates a DLP policy. The detection system 206 is used to detect the DLP policies and may perform some remedial or notification operation to help enforce the DLP policies. In the embodiments described herein, when the detection system 206 detects a violation, it temporarily blocks the data transfer 203 and notifies the DLP handshake protocol engine 122 of the violation. The DLP handshake protocol engine 122 initiates a handshake protocol with the destination entity to determine if the destination entity meets the minimum level of protection to protect the protected data in the data transfer 203. If the DLP handshake protocol engine 122 determines that the destination entity can protect the protected data, the DLP handshake protocol engine 122 can allow the data transfer. For example, the DLP handshake protocol engine 122 can notify the detection system 206, and the detection system removes the temporary block on the data transfer 203. However, if the DLP handshake protocol engine 122 determines that the destination entity cannot protect the data, the DLP handshake protocol engine 122 may prevent the data transfer, may allow the transfer but generate an incident report and/or notify an administrator. In another embodiment, the detection system 206 can ask the user if they would like to proceed with the data transfer, alerting them to the fact that the destination entity cannot protect the protected data. Alternatively, the DLP handshake protocol engine 122 and the detection system 206 can perform other remedial or preventative actions as would be appreciated by one of ordinary skill in the art having the benefit of this disclosure.

In some embodiments, when the detection system 206 can alert a user or an administrator after determining whether the destination entity can protect the data in the data transfer. Alternatively, the detection system 206 can alert both before and after this determination. Of course, the DLP handshake protocol engine 122 can also be configured to alert the user, administrator, or both. The alert may contain information about the violation, the destination entity, and the protections at the destination entity.

In one embodiment, when the DLP handshake protocol engine 122 determines that the destination entity cannot protect the data that would violate the policy, the violation reporter 208 creates an incident record of the violation, and sends the incident record to the DLP system 108 and/or stores the incident record in the local data store 130. The violation reporter 208 can send the incident records as they are generated or periodically. Similarly, the violation reporter 208 can send multiple incident records to the DLP system 108 in batches or sequentially. If a violation is detection, the violation reporter 208 may notify a system administrator (e.g., send an email or update a log file) about the policy violation incident, and may send information about the policy violation incident to the DLP service provider (e.g., DLP system 108). The information sent to the DLP service provider may identify, for example, the DLP policy being violated, the type of data being transferred, the destination entity specified to receive the data transfer, the DLP protection information of the destination entity, or other information concerning the violation, an identifier of the user or the client computing system 102 that caused the violation, as well as other information that may be helpful in remedying or recording the incidents.

The policy manager 302 defines DLP policies and stores them in the policy data store 212. The policy may require monitoring for data transfers. The policy manager 302 may create DLP policies based on user input, such as from the user of the client computing system 102 or an administrator of an organization providing the client computing system 102. Alternatively, the policy manager 302 may receive DLP policies from a DLP service provider (e.g., DLP system 108) and store them in the policy data store 212.

The DLP system 108 is configured to receive the incident record of the violation from the violation reporter 208, and may be configured to perform some remedial or reporting operation as would be appreciated by one of ordinary skill in the art having the benefit of this disclosure.

It should be noted that the DLP system 120 may include other components for monitoring outbound data transfers 203 for the data transfers to detect violations of the DLP policy, as well as other types of policies. Details regarding these other components have not been included so as to not obscure the description of the present embodiments.

Figure 3:
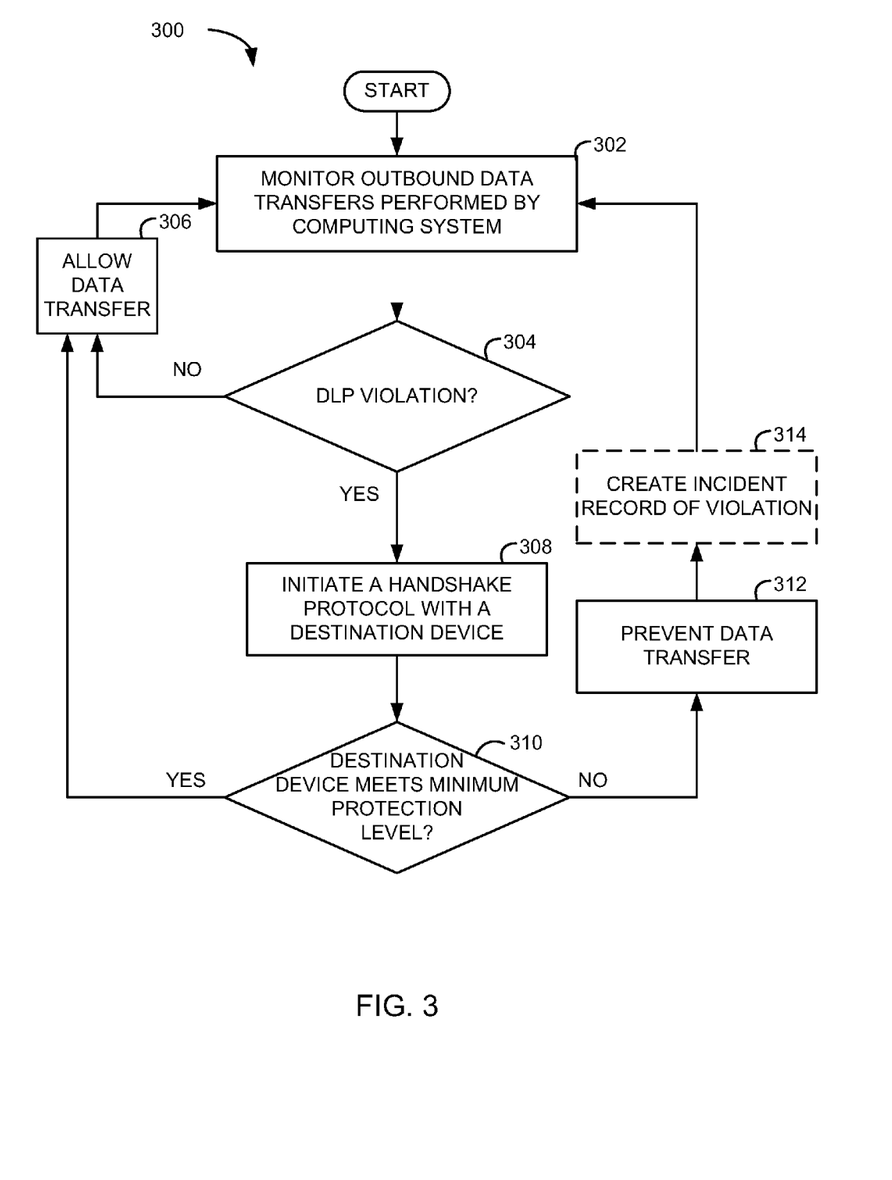
FIG. 3 is a flow diagram of one embodiment of a method of initiating a DLP handshake protocol when a violation of a DLP policy is detected.

FIG. 3 is a flow diagram of one embodiment of a method 300 of initiating a DLP handshake protocol when a violation of a DLP policy is detected. The method 300 is performed by processing logic that may comprise hardware (circuitry, dedicated logic, etc.), software (such as is run on a general purpose computing system or a dedicated machine), or a combination of both. In one embodiment, the client computing system 102 of FIG. 1 performs the method 300. In another embodiment, the DLP agent 120 of FIGS. 1 and 2 performs the method 300. In another embodiment, the DLP handshake protocol engine 122 of FIGS. 1 and 2 performs the method 300. Alternatively, other components of the client computing system 102 can be configured to perform some or all of the method 300.

Referring to FIG. 3, processing logic begins method 300 by monitoring outbound data transfers performed by the computing system (block 302). In one embodiment, the processing logic monitors outbound network traffic to other devices over a private or public network. Alternatively, the processing logic monitors other outbound data transfers, such as data transfers to other devices via other types of connections, including transfers to a USB drive, FTP file transfers, printing activities, or the like. While monitoring in block 302, processing logic determines if a violation of the DLP policy is detected (block 304). If the processing logic does not detect a policy violation at block 306, the processing logic allows the data transfer (block 306), and returns to monitoring at block 302. If the processing logic detects a DLP violation at block 304, the processing logic initiates a handshake protocol with a destination entity (e.g., a second computing system) (block 308) and determines whether the destination entity meets a minimum protection level for the DLP policy (block 310). In one embodiment, the processing logic uses information from the handshake protocol to decide whether the second computing system can sufficiently protect the data from data loss if the first computing system were to transfer the data to the second computing system. If the destination entity meets the minimum protection level, the processing logic allows the data transfer (block 306), and returns to monitoring at block 302. If the destination entity does not meet the minimum protection level at block 310, the processing logic prevents the current data transfer to the destination entity (block 312), and may create an incident record of the violation (block 314). In other embodiments, instead of preventing the data transfer, the processing logic may perform other operations as specified by the policy, such as notifying a system administrator, prompting the user to deny or allow the data transfer, and the like. Thus, the processing logic may transfer data to a second computing system, although it may even be a trusted or non-malicious system, only if the second computing system is proved to be capable of protecting the data from leaks, as established by the minimum protection level.

In one embodiment, the processing logic at block 304 determines if the current outbound data transfer includes protected information, as specified in the policy. For example, the outbound data transfer may include confidential data, or other types of protected information.

In one embodiment of the method, the processing logic temporarily blocks the current outbound data transfer to the destination entity (e.g., second computing system) in response to detection of the violation. While temporarily blocking the data transfer, the processing logic determines whether the destination entity meets the minimum protection level for the DLP policy. If the destination entity meets the minimum protection level, the processing logic permits the current data transfer, removing the temporary block and allowing the data transfer to occur. However, if the destination entity does not meet the minimum protection level, the processing logic prevents the current data transfer, and may create the incident record of the violation.

In another embodiment of the method, the processing logic verifies a presence of a second DLP agent or other type of DLP system on the destination entity, and determines if the second DLP agent meets the minimum protection level for the DLP policy. The processing logic at blocks 308 and 310 may perform various operations to determine whether the destination entity meets the minimum level of protection. In one embodiment, the processing logic initiates the handshake with a second DLP agent executing on the destination entity. The processing logic may determine whether the second DLP agent meets the minimum protection level in various ways. In one embodiment, the processing logic verifies a version of the second DLP agent, verifies a version of the DLP policy, or a combination of both. The processing logic may verify whether the second DLP agent has updated policies, such as the most recent version or an acceptable version. The processing logic may verify the signatures available to the DLP agent. The processing logic may verify when the when the second DLP agent was last updated, and whether the DLP agent has any missing updates in between when the second DLP agent was last updated.

In another embodiment, the processing logic determines if the second DLP agent meets the minimum protection level by verifying that signatures of the second DLP policy would detect the protected information in the current outbound data transfer. By doing this before permitting the current data transfer, the processing logic can determine whether the protected information can be protected by the second DLP agent on the destination entity.

In one embodiment, the DLP agents of the first and second computing systems are developed by the same entity. In another embodiment, the DLP agents are developed by different entities. In one embodiment, the computing systems reside in different networks. In another embodiment, the computing systems reside in the same network, such as the same private LAN.

In another embodiment, if the destination entity does not meet the minimum protection level, the processing logic can exchange information to update the destination entity to meet the minimum protection level. For example, if the DLP agent of the destination entity does not include the latest update to its DLP policy, the processing logic can send the latest update to destination entity. In another embodiment, the processing logic sends policy information, signatures to detect violations of the DLP policy, or any combination of information to ensure that the protected information will be protected at the destination entity.

In another embodiment of the method, the processing logic notifies a user or an administrator when the destination entity does not meet the minimum protection level. Alternatively, the processing logic can perform other DLP remedial or preventative actions as would be appreciated by one of ordinary skill in the art having the benefit of this disclosure.

Figure 4:
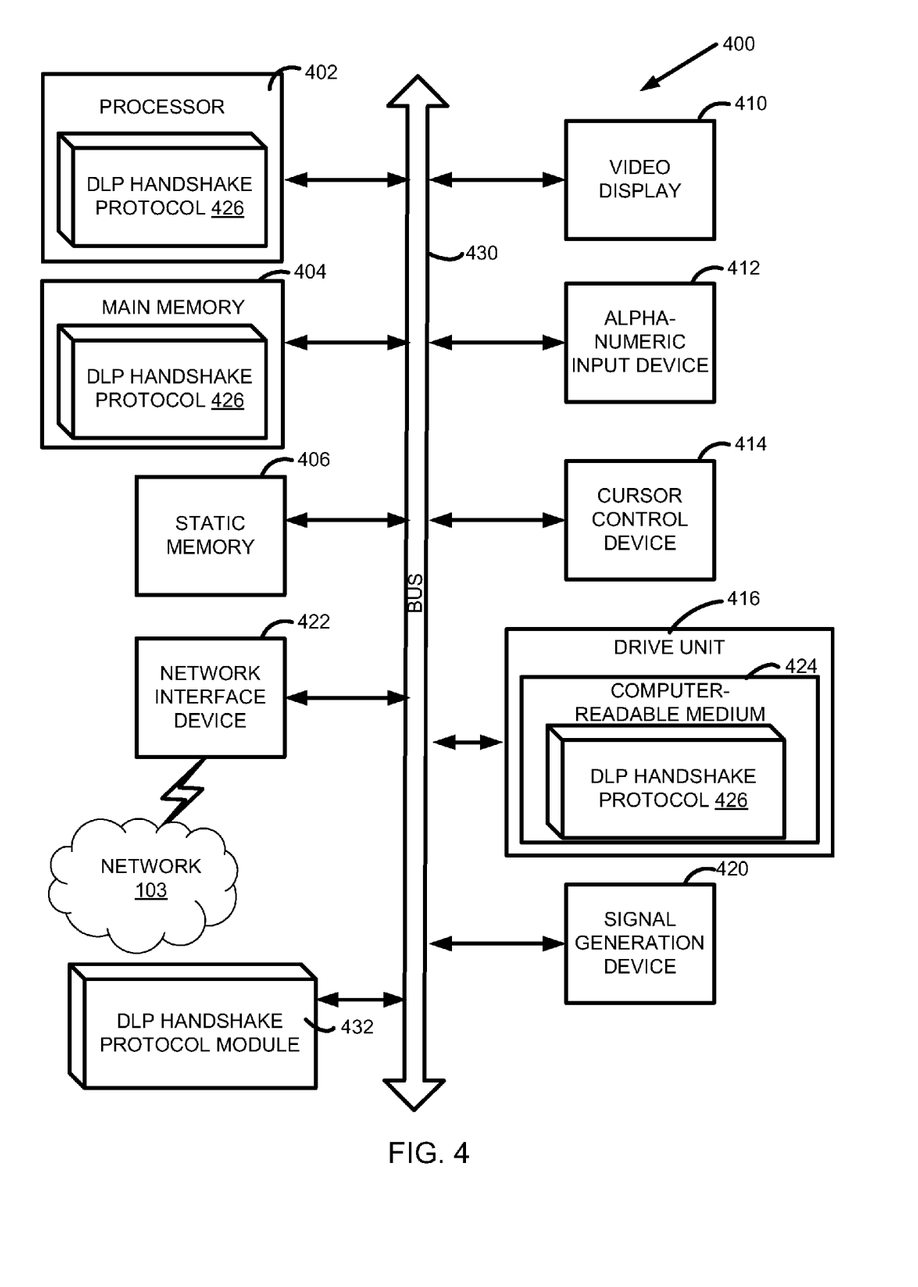
FIG. 4 illustrates a diagrammatic representation of a machine in the exemplary form of a computing system within which a set of instructions, for causing the machine to perform any one or more of the methodologies described herein, may be executed.

FIG. 4 illustrates a diagrammatic representation of a machine in the exemplary form of a computing system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as method 300 of FIG. 3.

The exemplary computing system 400 includes a processor 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a data storage device 418, which communicate with each other via a bus 406.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute the processing logic for DLP handshake protocol 426 for performing the operations and steps discussed herein.

The computing system 400 may further include a network interface device 422. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions (e.g., DLP handshake protocol 426) embodying any one or more of the methodologies or functions described herein. The DLP handshake protocol 426 may also reside, completely or at least partially, within the main memory 404 and/or within the processor 402 during execution thereof by the computing system 400, the main memory 404, and the processor 402 also constituting computer-readable media. The DLP handshake protocol 426 may further be transmitted or received over a network 420 via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The DLP handshake protocol module 432, components, and other features described herein (for example in relation to FIGS. 1, 2, 3) can be implemented as discrete hardware components or integrated in the functionality of hardware components such as ASICS, FPGAs, DSPs, or similar devices. The DLP handshake protocol module 432 may implement operations of DLP handshake protocol as described herein with respect to FIG. 3. In addition, the DLP handshake protocol module 432 can be implemented as firmware or functional circuitry within hardware devices. Further, the DLP handshake protocol module 432 can be implemented in any combination hardware devices and software components.

In the above description, well-known structures and devices are shown in block diagram form, rather than in detail, in order to avoid obscuring the present invention. Some portions of the description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "storing", "monitoring", "creating", "generating", "sending", "intercepting," "capturing," "mapping", "generating," or the like, refer to the actions and processes of a computing system, or similar electronic computing system that manipulates and transforms data represented as physical (e.g., electronic) quantities within the computing system's registers and memories into other data similarly represented as physical quantities within the computing system's memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. As discussed above, such a computer program may be stored in a computer readable medium.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a computing system programmed to perform the following, comprising:
monitoring, by a data loss prevention (DLP) agent, outbound data transfers performed by the computing system;
detecting, by the DLP agent, a violation of a DLP policy in a current one of the outbound data transfers to a second computing system;
initiating communication with the second computing system to determine whether the second computing system meets a minimum protection level for the DLP policy;

determining from the communication whether the second computing system meets the minimum protection level for the DLP policy, wherein the determining comprises determining from the communication whether the second computing system has a capability to identify protected data in the current outbound data transfer and to protect the protected data if the current outbound data transfer were transferred to the second computing system; and preventing the current data transfer to the second computing system when the second computing system does not meet the minimum protection level for the DLP policy.

2. The method of claim 1, wherein said initiating the communication comprises initiating the communication with a second DLP agent of the second computing system.

3. The method of claim 1, wherein said detecting the violation of the DLP policy comprises detecting that the current outbound data transfer comprises protected information.

4. The method of claim 3, wherein the protected information comprises confidential data.

5. The method of claim 1, further comprising:
temporarily blocking the current outbound data transfer to the second computing system in response to detecting the violation of the DLP policy;
while said temporarily blocking, determining whether the second computing system meets the minimum protection level for the DLP policy;
after said determining, permitting the current data transfer to the second computing system when the second computing system meets the minimum protection level for the DLP policy; and
after said determining, preventing the current data transfer to the second computing system when the second computing system does not meet the minimum protection level for the DLP policy.

6. The method of claim 1, wherein the communication comprises:
verifying a presence of a second DLP agent on the second computing system; and
determining if the second DLP agent meets the minimum protection level for the DLP policy.

7. The method of claim 6, wherein said determining if the second DLP agent meets the minimum protection level comprises verifying a version of the second DLP agent.

8. The method of claim 6, wherein said determining if the second DLP agent meets the minimum protection level comprises verifying a version of a second DLP policy of the second DLP agent.

9. The method of claim 8, wherein said detecting the violation of the DLP policy comprises detecting that the current outbound data transfer comprises protected information, and wherein said determining if the second DLP agent meets the minimum protection level comprises verifying that signatures of the second DLP policy would detect the protected information in the current outbound data transfer.

10. The method of claim 6, wherein said determining if the second DLP agent meets the minimum protection level comprises:
determining when the second DLP agent was last updated; and
determining whether the second DLP agent has any missing updates in between when the second DLP agent was last updated.

11. The method of claim 6, wherein the DLP agent is developed by a first entity and the second DLP agent is developed by a second entity.

12. The method of claim 6, wherein the computing system and the second computing system reside in a same private network.

13. The method of claim 1, wherein the communication further comprises exchanging information to update the second computing system to meet the minimum protection level.

14. The method of claim 13, wherein said exchanging information comprises sending at least one of policy information of the DLP policy or signatures to detect violations of the DLP policy.

15. The method of claim 1, further comprising notifying a user of the computing system when the second computing system does not meet the minimum protection level for the DLP policy.

16. A computing system, comprising:
a memory; and
a processor coupled with the memory to:
monitor, by a data loss prevention (DLP) agent, outbound data transfers performed by the computing system;
detect, by the DLP agent, a violation of a DLP policy in a current one of the outbound data transfers to a second computing system;
initiate communication with the second computing system to determine whether the second computing system meets a minimum protection level for the DLP policy;
determine from the communication whether the second computing system meets the minimum protection level for the DLP policy by determining from the communication whether the second computing system has a capability to identify protected data in the current outbound data transfer and to protect the protected data if the current outbound data transfer were transferred to the second computing system; and
prevent the current data transfer to the second computing system when the second computing system does not meet the minimum protection level for the DLP policy.

17. The computing system of claim 16, wherein the processor is further to:
temporarily block the current outbound data transfer to the second computing system in response to detecting the violation of the DLP policy;
while temporarily blocking, determine whether the second computing system meets the minimum protection level for the DLP policy;
permit the current data transfer to the second computing system when the second computing system meets the minimum protection level for the DLP policy; and
prevent the current data transfer to the second computing system when the second computing system does not meet the minimum protection level for the DLP policy.

18. A non-transitory computer readable storage medium including instructions that, when executed by a processor, cause the processor to perform operations comprising:
monitoring, by a data loss prevention (DLP) agent, outbound data transfers performed by the computing system;
detecting, by the DLP agent, a violation of a DLP policy in a current one of the outbound data transfers to a second computing system;
initiating communication with the second computing system to determine whether the second computing system meets a minimum protection level for the DLP policy;
determining from the communication whether the second computing system meets the minimum protection level for the DLP policy, wherein the determining comprises determining from the communication whether the second computing system has a capability to identify protected data in the current outbound data transfer and to protect the protected data if the current outbound data transfer were transferred to the second computing system; and preventing the current data transfer to the second computing system when the second computing system does not meet the minimum protection level for the DLP policy.

19. The non-transitory computer readable storage medium of claim 18, wherein the operations further comprises:

temporarily blocking the current outbound data transfer to the second computing system in response to detecting the violation of the DLP policy;

verifying a presence of a second DLP agent on the second computing system; and determining if the second DLP agent meets the minimum protection level for the DLP policy.

20. The non-transitory computer readable storage medium of claim 18, wherein said determining if the second DLP agent meets the minimum protection level comprises at least one of the following:

verifying a version of the second DLP agent;

verifying a version of a DLP policy of the second DLP agent;

verifying signatures of the second DLP policy to detect protected information in the current outbound data transfer;

determining when the second DLP agent was last updated; or determining whether the second DLP agent has any missing updates in between when the second DLP agent was last updated.

* * * * *